Nov. 4, 1952     W. B. CONDIT ET AL     2,616,585
FILLER CAP ASSEMBLY
Filed March 20, 1950     2 SHEETS—SHEET 1
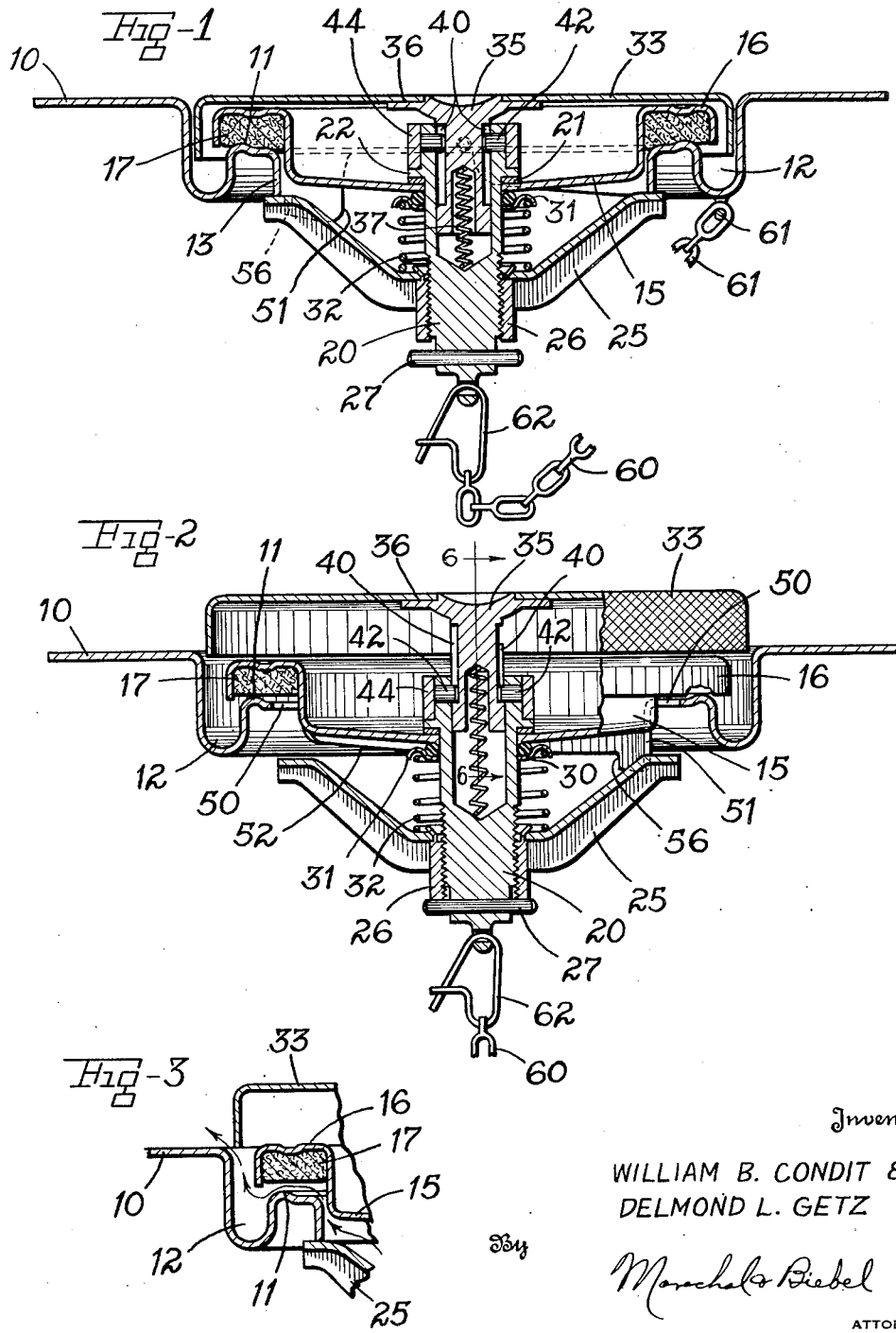
Inventors
WILLIAM B. CONDIT &
DELMOND L. GETZ
ATTORNEYS Nov. 4, 1952  W. B. CONDIT ET AL  2,616,585
FILLER CAP ASSEMBLY
Filed March 20, 1950  2 SHEETS—SHEET 2
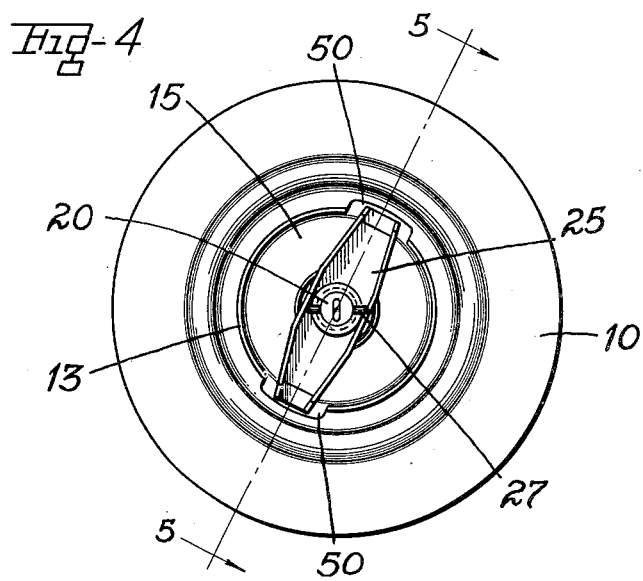
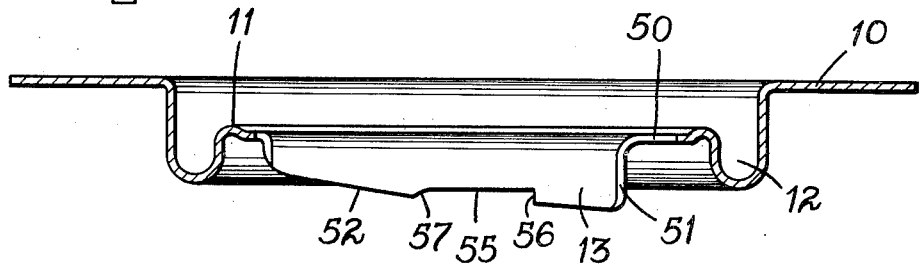
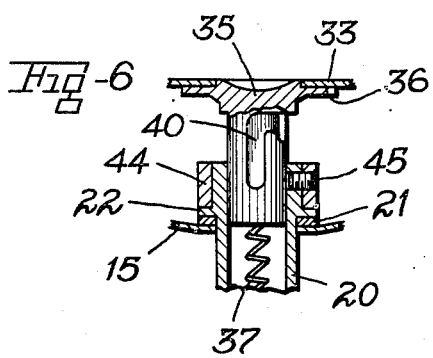
Inventors
WILLIAM B. CONDIT &
DELMOND L. GETZ
By Marechal & Biebel
ATTORNEYS

UNITED STATES PATENT OFFICE 2,616,585

FILLER CAP ASSEMBLY

William B. Condit and Delmond L. Getz, Springfield, Ohio, assignors to The Steel Products Engineering Company, Springfield, Ohio, a corporation of Ohio Application March 20, 1950, Serial No. 150,688

2 Claims. (Cl. 220—25)

This invention relates to filler cap assemblies adapted for use with fuel tanks and other containers wherein the interior of the container is under pressure, such for example as the case of fuel tanks for airplanes, and more particularly to an assembly of this character which includes a closure adapted to seat on the rim of the inlet opening of the container and a clamp adapted to engage the under side of the rim to secure the closure in sealing position.

One of the principal objects of the invention is to provide a filler cap assembly of this character which is simple in construction and operation, which will retain the desired seal on the container under positive pressures, and wherein the clamp is threaded on a stud extending through the closure and provided with an operating handle which serves also as the cover for the assembly and is effective to rotate the stud in order to produce relative clamping or unclamping movement of the closure and clamp as desired.

It is also an object of the invention to provide such a filler cap assembly wherein the cover which forms the operating handle is shiftable between a raised position for operation and a retracted position closely adjacent the closure in order to facilitate the mounting of the assembly in flush relation with the surrounding surface of the container to give minimum wind resistance for installations such as the wing tanks of an airplane.

Other objects and advantages of the invention will be apparent from the following description, the accompanying drawings and the appended claims.

In the drawings—

Fig. 1 is a view in vertical section of a filler cap assembly in accordance with the invention showing the closure member thereof in sealing position and with the cover or handle retracted;

Fig. 2 is a view similar to Fig. 1 showing the handle raised for operation and the assembly released preparatory to removal;

Fig. 3 is a fragmentary view illustrating the operation of the assembly;

Fig. 4 is an elevational view of the assembly from the under side thereof;

Fig. 5 is a detail sectional view of the adapter for the assembly; and

Fig. 6 is a fragmentary view taken approximately as indicated by the line 6—6 in Fig. 2.

Referring to the drawings, which illustrate a preferred embodiment of the invention, the adapter 10 is formed of sheet metal, and its peripheral portion is adapted to be welded or otherwise secured to a container such as the fuel tank of an aircraft or other vehicle. The adapter includes an annular rim 11 which is located below the upper level of the adapter and surrounds the filling opening. Between the outer portion of the adapter of the rim 11 is an annular groove or recess 12, and this recessed inner portion of rim 11 is turned down to provide a flange 13 extending inwardly of the filling opening.

The main closure member 15 is generally cup-shaped and includes a turned-over rim portion 16 serving as a retainer for an annular gasket 17 adapted to seat on the rim 11 to seal the filling opening. An operating stud 20 having a threaded lower portion extends through a central opening in closure member 15, and a thrust washer 21 is positioned between the upper surface of closure member 15 and a circumferential shoulder 22 on stud 20. A double-armed clamping member 25 of channeled cross section is carried by a nut 26 threaded on stud 20 and having its upper end peened to clamp 25 and a pin 27 is secured in the lower end of the stud to limit relative unscrewing of the stud and nut. The opening in closure member 15 through which stud 20 extends is sealed by means of a rubber O-ring 30 held in position by a thrust washer 31 and a spring 32 positioned between washer 31 and the upper surface of clamp 25.

The clamp 25 is adapted to engage the lower rim of the flange portion 13 of adapter 10, and thus when the stud 20 is rotated, the closure member 15 and nut 26 will be drawn together to clamp the gasket 17 against the rim 11. Accordingly, the stud 20 is provided with an operating handle 33 which forms a cover for the assembly and is connected with stud 20 through a locking stud 35 to which cover 33 is welded or otherwise permanently secured at 36 and which forms a stem for the cover. The upper end of stud 20 is provided with a central bore for receiving the stud 35, and a spring 37 is located in this bore to bias stud 35 and cover 33 upwardly.

The locking stud 35 is provided with bayonet slots 40 in either side thereof, and these slots receive a pair of pins 42 extending through the wall of stud 20 and held in position by means of a collar 44 pressed over the upper end of stud 20 and held thereon by means of a set screw 45 (Fig. 6). The pins 42 thus cooperate with slots 40 to form a driving connection between the studs 20 and 35, and the slots are in turn so arranged that when the pins are in the shorter portion thereof, the handle or cover 33 will be held in retracted position wherein it is received within the recess 12 with its upper surface substantially flush with the surrounding surface of adapter 10. When the pins are located in the longer portion of the slots, the cover is free to rise under the biasing force of spring 37 to the full extent permitted by the slots 40, as shown in Fig. 2.

The rim 11 is provided with a pair of slots 50 in the inner portion thereof which extend through the flange 13 to receive the ends of the clamp arms 25. Each slot 50 terminates in a shoulder or stop 51 at one end, and at the opposite end of the slot, the lower edge of the flange 13 is curved downwardly to form an inclined cam portion 52 leading to a notch 55 sufficiently wide to receive the outer ends of the clamp arms 25 therein. Each notch 55 terminates at one end in a shoulder or stop 56, and at its other end the notch is connected with cam 52 by a rounded shoulder 57. It will also be noted that the entire cap assembly is loosely attached to the adapter for safety purposes by means of a chain 60 secured at one end to the adapter 10 by means of a welded eyelet 61 and having its other end connected to the stud 20 by means of a safety pin 62.

Fig. 1 shows the assembly in closed and sealed position, with the ends of the clamp arms 25 engaging the lower rim of flange 13 and seated within the notches 55. The nut 26 is in raised position with respect to operating stud 20, and the shoulder 22 and thrust washer 21 on the stud hold the closure member 15 down to seal the gasket 17 against the rim 11, the rim parts 12 and 13 being thus effectively clamped between the closure member 15 and the clamp 25. Also, the cover 33 is in its lowermost position wherein the pins 42 are engaged in the shorter legs of the bayonet slots 40, and it will be noted that in this position, the upper surface of the cover 33 is substantially flush with the surrounding flange portion of the adapter and thus with the surrounding surface of the tank on which the assembly is mounted.

In order to open the assembly, the first step is to press down on cover 33 and rotate it to a sufficient extent to effect relative shifting of the pins 42 into the longer legs of the slots 40, whereupon the spring 37 will urge the cover upwardly to the position shown in Fig. 2 for more convenient handling. The cover is then rotated in counterclockwise direction as viewed from above, and this movement is transmitted through the slots 40 and pins 42 to the operating stud 20, causing the latter to move upwardly with respect to nut 26, since the clamp arms are prevented from rotation by their engagement in the notches 55. If there is positive pressure within the container, the closure member will lift away from rim 11 as shown in Fig. 3, and then as soon as the unscrewing has proceeded sufficiently to permit the clamp arms to clear these notches, the clamp also rotates until its arms strike the shoulders 51. Since in this position, the clamp arms are aligned with the slots 50, the assembly can then be lifted out of the adapter.

To mount the assembly in sealing position, the reverse procedure is followed. The unit is set in place by inserting the clamp arms through the slots 50 and then rotating the cover 33 in clockwise direction as viewed from above. The clamp 25 will also turn until its arms strike the shoulders 56 at the ends of the notches 55, which will act as stops holding the clamp, the stud 20 and nut 26 being so proportioned that when they are relatively unscrewed to the limit permitted by pin 27, the clamp arms will clear shoulders 57 but will strike shoulders 56. Continued rotation of the cover will cause the operating stud 20 to move downwardly with respect to nut 26 and thus to draw the closure member 15 and clamp 25 together into sealing position, with the ends of the clamp arms being tightened in seated position within the notches 55 to effect definite positioning of the clamp when the cap is under pressure and thus to prevent possible vibration of the clamp in such manner that it might twist back to its release position in alignment with the slots 50. The final step in the closing operation is to press cover 33 downwardly against spring 37 and twist it sufficiently to lock the pins 42 in the shorter legs of the bayonet slots 40.

It will thus be seen that the present invention provides a simple filler cap assembly which has been found highly suitable for uses such as with the fuel tanks of aircraft and other vehicles. An assembly constructed as described and shown has been found fully satisfactory for use with the fuel tanks of military aircraft under tests covering a wide range of service conditions, including leakage, vibration and gunfire at temperatures as low as minus 70° F. and pressures ranging from 15 to 35 pounds per square inch. The flush type mounting with the adapter 10 as described is particularly useful for installations such as on wing fuel tanks of aircraft, since it provides minimum resistance to air flow as a result of the substantial absence of projecting parts.

Reference is made to the copending applications of L. E. Rausenberger, Serial No. 150,655, and L. E. Rausenberger and D. L. Getz, Serial No. 150,656, filed of even date herewith and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A filler cap assembly for the inlet of a container to retain positive pressure on the contents thereof, comprising an adapter including an annular rim defining an inlet opening, a closure adapted to seat on the upper surface of said rim to close said opening, a threaded stud extending through said closure and having thereon a shoulder adapted to engage the upper surface of said closure, a clamp threaded on the lower portion of said stud and adapted for positive clamping engagement with the under side of said rim upon rotational movement of said stud to clamp said rim between said clamp and said closure, said stud having a hollow bore in the upper end thereof, a handle having a stem slidably received within said bore, a spring mounted within said bore for biasing said stem and handle upwardly to a raised position, means forming a driving interconnection between said stem and said stud to rotate said stud and thus to effect said clamping and unclamping movement of said clamp in response to rotational movement of said cover, said handle being compressible against said spring to a retracted position, and means for releasably securing said handle in said retracted position.

2. A filler cap assembly for the inlet of a container to retain positive pressure on the contents thereof, comprising an adapter including an annular rim defining an inlet opening, a closure adapted to seat on the upper surface of said rim to close said opening, a threaded stud extending through said closure and having thereon a shoulder adapted to engage the upper surface of said closure, a clamp threaded on the lower portion of said stud and adapted for positive clamping engagement with the under side of said rim upon rotational movement of said stud to clamp said rim between said clamp and said closure, said stud having a hollow bore in the upper end thereof, a handle having a stem slidably received within said bore, a spring mounted within said bore for biasing said stem and handle upwardly to a raised position, said handle being compressible against said spring to a retracted position, said stem having a slot in the outer surface thereof, a projection on said stud engaging in said slot to limit relative axial movement of said stem and stud and to form with said slot a driving interconnection for rotating said stud to effect said clamping and unclamping movement of said clamp in response to rotational movement of said cover, and said slot including a laterally offset position cooperating with said projection to secure said handle in said retracted position.

WILLIAM B. CONDIT.
DELMOND L. GETZ.

REFERENCES CITED

The following references are of record in the file of this patent:

UNITED STATES PATENTS

| Number | Name | Date |
|---|---|---|
| 1,698,147 | Whitten | Jan. 8, 1929 |
| 1,845,409 | Golden | Feb. 16, 1932 |
| 2,316,507 | Dykeman | Apr. 13, 1943 |
| 2,333,890 | Russell | Nov. 9, 1943 |
| 2,375,671 | Malluk | May 8, 1945 |
| 2,408,233 | Smith | Sept. 24, 1946 |
| 2,416,637 | Minella | Feb. 25, 1947 |
| 2,524,823 | Noyes | Oct. 10, 1950 |
| 2,552,053 | Miller | May 8, 1951 |
| 2,570,818 | Kirkbride et al. | Oct. 9, 1951 |

FOREIGN PATENTS

| Number | Country | Date |
|---|---|---|
| 327,256 | Great Britain | Apr. 3, 1930 |
| 588,581 | Great Britain | May 28, 1947 |